E. A. SPERRY.
PLOTTING INDICATOR.
APPLICATION FILED DEC. 18, 1914.

1,215,425.

Patented Feb. 13, 1917.
3 SHEETS—SHEET 1.

WITNESSES:
Albert F. Fisk,
Aug. F. Schraegle

INVENTOR.
ELMER A. SPERRY,
BY Herbert H. Thompson
ATTORNEY.

E. A. SPERRY.
PLOTTING INDICATOR.
APPLICATION FILED DEC. 18, 1914.
1,215,425.
Patented Feb. 13, 1917.
3 SHEETS—SHEET 2.
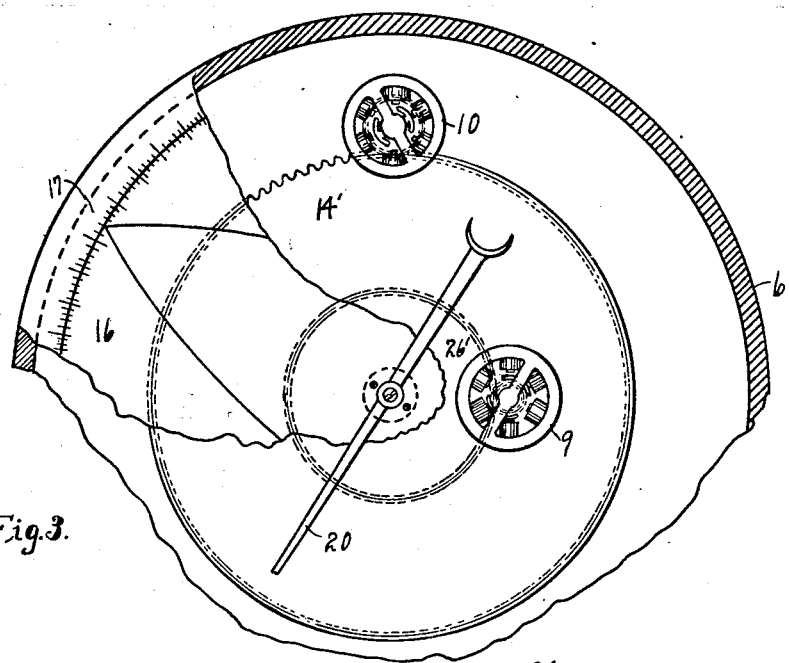
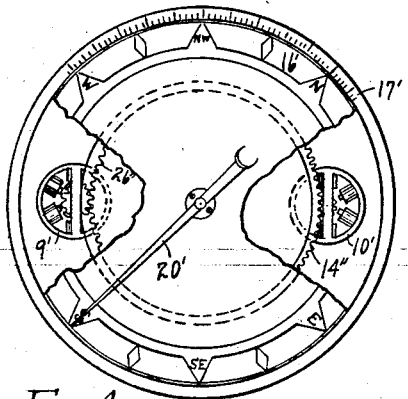
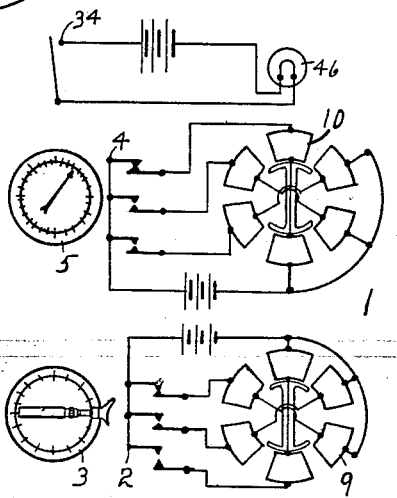
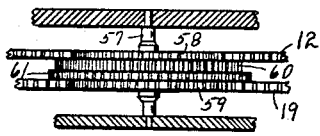
WITNESSES:
Albert F Fisk,
Aug. F. Schraegle
INVENTOR.
ELMER A. SPERRY,
BY Herbert H. Thompson,
ATTORNEY.

E. A. SPERRY.
PLOTTING INDICATOR.
APPLICATION FILED DEC. 18, 1914.

1,215,425.

Patented Feb. 13, 1917.
3 SHEETS—SHEET 3.

WITNESSES:
Albert J Fisk,
Aug. F. Schraegle

INVENTOR.
ELMER A. SPERRY,
BY Herbert H. Thompson,
ATTORNEY.

UNITED STATES PATENT OFFICE.

ELMER A. SPERRY, OF BROOKLYN, NEW YORK, ASSIGNOR TO THE SPERRY GYROSCOPE COMPANY, OF NEW YORK, N. Y., A CORPORATION OF NEW YORK.

PLOTTING-INDICATOR.

1,215,425.     Specification of Letters Patent.     Patented Feb. 13, 1917.

Application filed December 18, 1914. Serial No. 877,953.

*To all whom it may concern:*

Be it known that I, ELMER A. SPERRY, a citizen of the United States of America, residing at 100 Marlborough road, Brooklyn, New York, have invented certain new and useful Improvements in Plotting-Indicators, of which the following is a specification.

This invention relates to a novel system adapted for use on war vessels to indicate to the plotting room the bearings of the target. The plotting room on a war vessel is located down in the hold far below the water line and it is here that the battle maneuvers are laid out on a fixed chart, so that the chart will not only show the past and present positions of the ship and target, which includes the range and bearings of the target, but will predict the future range and bearings for a predetermined length of time. Since the plotting operator is without means of obtaining the necessary data directly, it is obvious that such data must be transmitted from the points at which it is obtained.

My invention relates especially to means for transmitting the target bearings from the target bearing telescope to the plotting room in the best possible manner.

The drawings illustrate several forms which my invention may assume.

Figs. 3 and 4 are plan views of two modifications.

Fig. 5 is a wiring diagram, showing the complete system.

Fig. 6 is a detail of Fig. 1.

Figure 1:
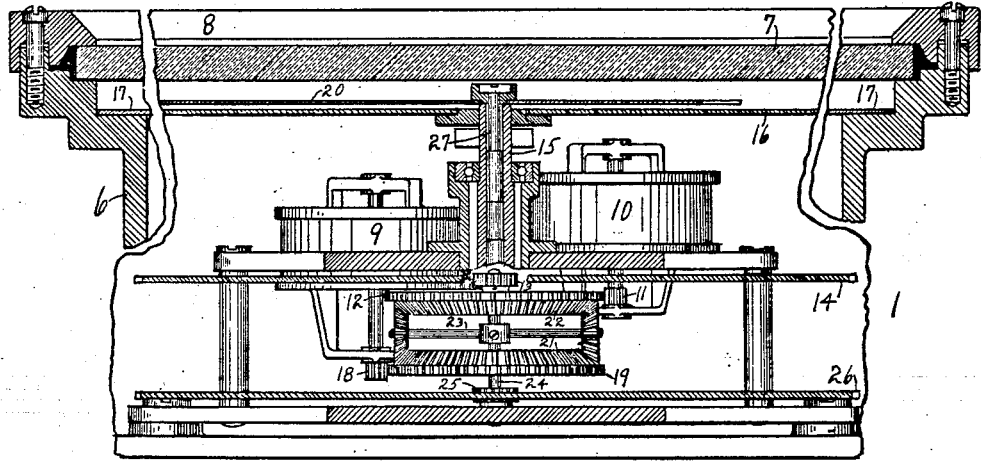
Figure 1 is a cross section of the instrument I term a plotting indicator, on line 1—1 of Fig. 2, looking in the direction of the arrows.

My system embodies as a fundamental principle the transmission of the bearings by visual means, as distinguished from the prior, auditory systems. It comprises essentially an indicator 1, adapted to be placed in the plotting room, which I term the plotting indicator and a transmitter 2 for actuating said indicator, connected preferably directly to the target bearing telescope 3 on the ship. This transmitter may hence appropriately be termed the target bearing transmitter. A third instrument is also necessary for the best results, namely, an azimuth transmitter 4, preferably actuated by a gyro-compass 5. (See Fig. 5.)

Figure 2:
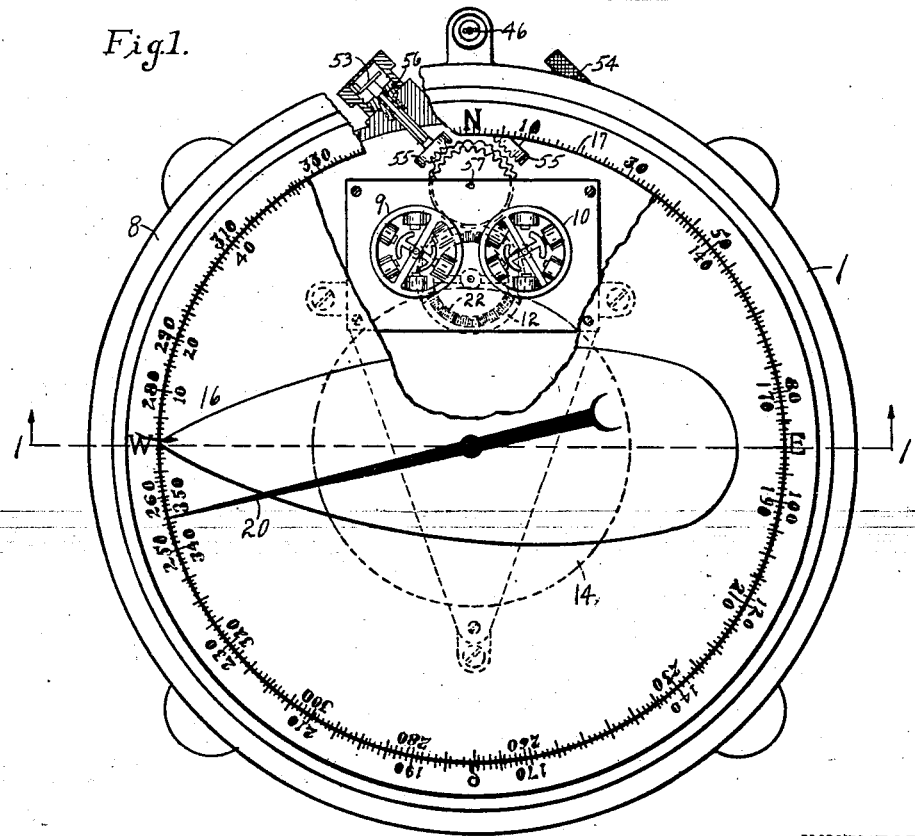
Fig. 2 is a plan view thereof, partly broken away and on a smaller scale.

My preferred form of plotting indicator is shown in Figs. 1, 2 and 6. In these figures, 6 denotes a suitable casing, closed at the top by a transparent cover 7, which is held in place by the bezel 8. Within the casing is mounted all of the movable apparatus, including the indicating dials. The actuating means comprises a plurality of repeater motors, 9 and 10 of any type, preferably of the well known class shown in Fig. 5. Motor 10 is designed to be connected with the azimuth transmitter 4 on the master compass 5, but should be connected backwardly thereto, for reasons which will presently appear. Said motor carries a pinion 11 which drives a gear 12. Mounted on the hub of said gear is a pinion 13 which meshes with the large gear wheel 14. An elongated sleeve 15 is secured adjacent one end to the hub of said gear and carries adjacent its other end the indicating dial 16, which serves as a lubber's line indicator or lubber's scale. Concentric with said dial is mounted a fixed graduated annulus 17, which represents the points of the compass, and hence is in effect a dummy compass card.

The reason why it is necessary to connect the motor 10 so as to rotate dial 16 in the opposite direction from the direction in which the master compass and the ordinary repeaters turn will now be apparent, since what the master compass does when a ship turns in a clockwise direction is to turn counterclockwise so that if it is desired to have a dial to turn in the same direction as the ship with respect to an artificial dummy compass card fixed on the ship, one must turn it in the opposite direction from the movements of a real compass.

Motor 9 carries a pinion 18 meshing with a gear 19. Motor 9 does not drive the target bearing indicator 20 directly, however, since it will be at once apparent that the position of the bearing index in azimuth is affected not only by the position of the target bearing telescope but also by the position of the ship itself. The motion of the two motors 9 and 10 must hence be combined to drive said index 20. The preferred method of accomplishing this result is by interposing a differential gear train. The drawings show the use of a bevel gear epicylic train, with one bevel gear 21 secured to gear 19, and the opposite bevel gear 22 secured to gear 12. The planetary arm 23, of the train is secured to the shaft 24, which carries a pinion 25 adjacent its lower end. A second large gear wheel 26 meshes with said pinion and is mounted on a central shaft 27 extending freely through sleeve 15 and carrying adjacent its upper end the target bearing index 20.

The modification shown in Fig. 3 is very similar, except that instead of using a differential gear train to combine the motions of the two motors, the motor 9 is mounted directly on the large gear wheel 14' driven by motor 10, so that the gear 26', driven directly from motor 9, receives a combined motion from both motors as before.

In Fig. 4, however, a somewhat different design is illustrated. According to this modification the outer fixed dial 17' is designed to serve as a lubber's scale, while the inner dial 16' actuated from the master compass, becomes a repeater compass card, showing, if the instrument is correctly placed, the true meridian. According to this modification, then, the compass motor 10' drives the dial 16' directly as before but is connected so as to turn it in the same direction that the master compass turns, that is so that the instrument becomes a true repeater compass. Also, the motor 9', drives the index 20' directly through the gear 26'', without the interpolation of a compensating factor from motor 10', since the lubber's line, according to this modification, is fixed.

In comparing the three modifications, it should be noted that the same general results are secured in each instance, namely the indication to the plotting board operators of the heading of the ship in azimuth, the bearings of the target in azimuth and the bearings of the target with respect to the ship. But the form shown in Figs. 1 and 2 possesses the important advantage of having the points of the compass fixed with respect to the ship instead of fixed in azimuth. This advantage arises from the fact that the chart on the plotting board is normally fixed on the ship and the points of the compass are arbitrarily positioned thereon according to the usual custom, so that if the plotting indicator is also provided with fixed compass markings, such as scale 17, the lines on the chart may always be laid out parallel to the lubber's line scale and target bearing index on the indicator.

Figure 7:
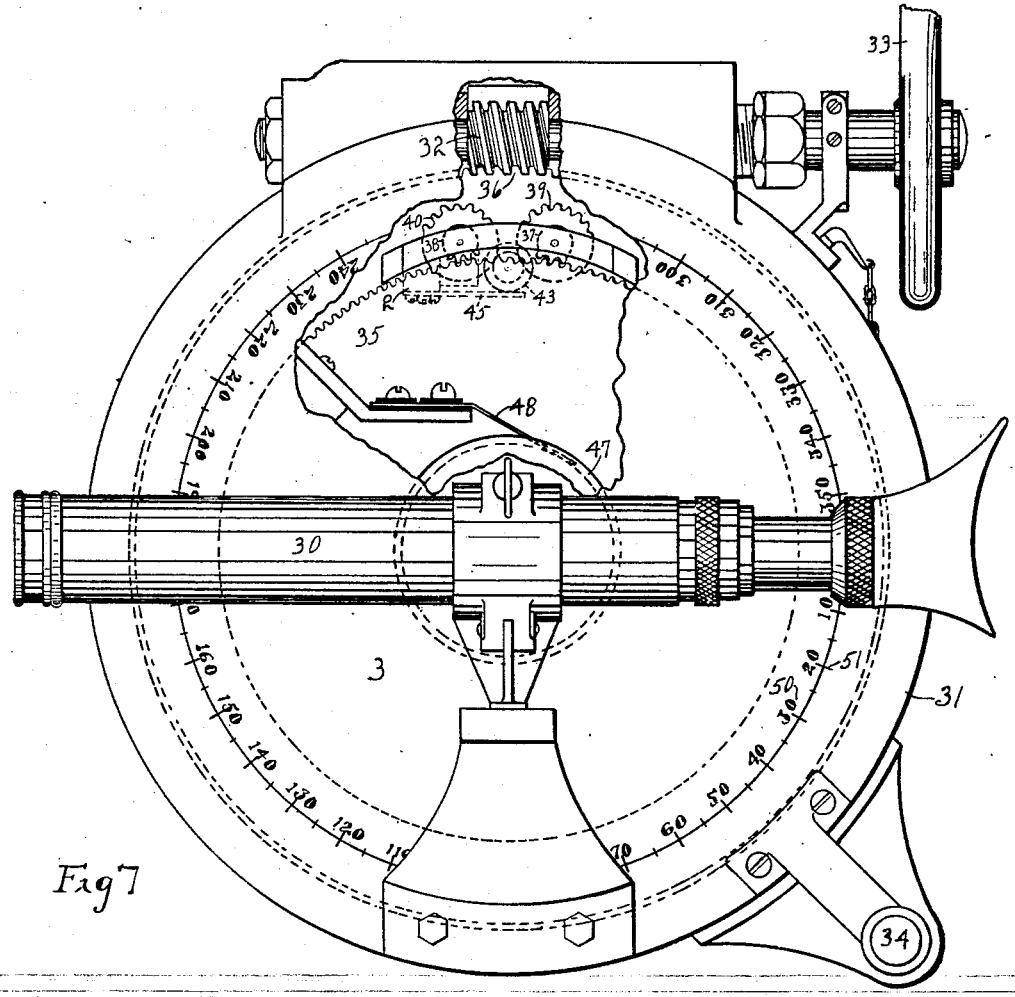
Fig. 7 is a plan view of a target bearing telescope with my transmitter attached, parts being broken away for clearness.
Figure 8:
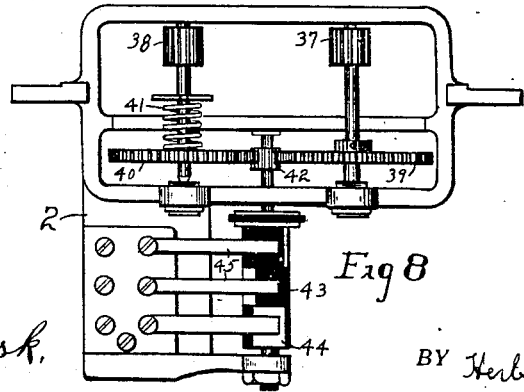
Fig. 8 is an elevation of the transmitter detached.

A target bearing telescope 3 with a transmitter attached is shown in Fig. 7. The telescope proper 30 is secured to a rotatably mounted annular base 31. Secured to this base are the worm 32, with its actuating hand wheel 33, a push button 34, and a large gear 35. On the fixed portion of the supporting standard, the large worm wheel 36 is secured with which worm 32 meshes. On top of the standard a fixed scale 50 is provided to coöperate with suitable indications 51 on the rotatable base. Also secured to said fixed standard is the transmitter 2, shown in detail in Fig. 8. It is provided with a pair of driving pinions 37 and 38, both of which mesh with said gear 35. A gear 39 is fixed to the shaft of pinion 37, while on the shaft of pinion 38, a gear 40 is loosely mounted, but is connected to said shaft through a spiral spring 41. Both gears 39 and 40 mesh with a common pinion 42, which turns directly the commutator 43. By providing this peculiar construction, I am enabled to do away with errors arising from the back lash of the gears, since the spring always presses the two pinions firmly against the same side of the teeth throughout the gear train. The commutator 43 or transmitter proper may be of any type designed to actuate the type of repeater motors used. Fig. 8 shows it as a three sectioned drum, each section having two conducting strips 44 of about 90°, the two strips being diametrically opposite and spaced by insulation. The strips on each section are placed about 30° ahead of the position of the strips on the preceding section, and are all grounded to the frame. A brush 45 is provided for each section. The action of this transmitter is well shown in Fig. 5, in which three contacting points are shown, which are arranged to be brought into successive engagement as the transmitter is actuated.

The button 34 is provided as a means of signaling the plotting room when the true bearings of the target are obtained. It closes a circuit through a miniature lamp 46 on the plotting indicator, so that the operators may know when to begin laying out the battle. An electric circuit is brought into the button 34 through slip rings 47 and brushes 48.

In order to synchronize the readings of the plotting indicator with the master controlling instruments, setting handles 53 and 54 may be employed. Each handle is provided with a crown gear 55 and is normally pressed outward by a spring 56. An auxiliary shaft 57 (see Fig. 6) is provided to carry the gears adapted to engage said crown gears. On said shaft is mounted a gear 58 driven from gear 12 and a gear 59 driven from gear 19. Secured to gear 58 is a gear 60 with which the crown gear of one of said setting handles is adapted to mesh on being pushed in, while secured to gear 59 is a corresponding gear 61 for the other handle.

The operation of my system is as follows: The plotting indicator is first synchronized with its controlling instruments. This is preferably done as far as the target bearing index is concerned by bringing both the telescope and index to zero on the lubber's scale. The operator of the telescope then starts to bring his instrument to bear on the target. At the same time the index 20 reproduces the movements of the telescope in the plotting room by the electric connections explained above. As soon as the telescope operator has obtained the correct bearings, he presses button 34, thus signaling the plotting room that the index is "on the target."

The lubber's scale in Figs. 1 and 2, or the compass card in Fig. 3 is constantly maintained in the correct position by the master compass, so that as soon as the target is spotted and the range found, the plotting can be commenced. From this chart, the bearings and range are predicted and sent out to the turrets.

In the preferred forms of the invention (Figs. 1 and 3) a peculiar function of the setting handles arises. This is due to the fact that a rotation or movement of one of the indicating elements produces a torque or tendency to move the other element through physical contact such as the reactions of the differential gear train or its equivalent. To prevent the other element from moving when setting one element with the corresponding handle, the operator simply pushes in on the other handle and holds it. Thus both handles are used simultaneously, but for different purposes in this instance.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. Thus, in addition to its use in the plotting room, my invention also possesses an important advantage as a steering compass. In battle formation, it is just as important for the pilot to keep the target bearing angle as constant as possible as it is for him to maintain his course. With my invention before him, this becomes a simple matter, since all that need be done is to hold the angle made by pointer 20 on dial 16 constant in the form shown in Fig. 2, or in Fig. 4 to maintain the reading of pointer 20' on scale 17' constant. No additional instrument is required, as the same indicator shows the course and the target bearings.

Having described my invention, what I claim and desire to secure by Letters Patent is:

1. A nautical instrument comprising an azimuth indicator, a lubber's line indicator and a target bearing index; the several parts being conjointly readable and adapted to be automatically actuated.

2. In navigational apparatus, the combination with a master compass and a target bearing telescope, of a fixed indicator, a plurality of movable indicators adapted to be automatically controlled by said compass and telescope all of said indicators being conjointly readable, whereby the bearings of the target both with respect to the meridian and to the lubber's line of the ship are shown simultaneously.

3. A telemetric azimuth indicating device for use on shipboard comprising an indicator normally fixed on the ship and adapted to show arbitrary points in azimuth, and a lubber's line indicator rotatably mounted adjacent said azimuth indicator and adapted to be actuated from a master compass.

4. A plotting indicator comprising a fixed dummy compass scale, a rotatable lubber's line indicator, a target bearing indicator and automatic means to operate each of said indicators, whereby the bearings of the ship and target are shown both with respect to each other and with respect to a fixed chart.

5. In a target bearing indicating system, the combination with a sighting instrument and a compass, each being provided with a transmitter, a repeater motor actuated from each transmitter, a lubber's line indicator connected to said compass motor, and a target bearing indicator connected to both of said motors.

6. In a target bearing indicating system, the combination with a sighting instrument and a compass, each being provided with a transmitter, a motor actuated from each transmitter, a lubber's line indicator geared to said compass motor, a target bearing indicator, and a differential gear train connecting said last named indicator to both of said motors.

7. In a ship's indicator, the combination with a sighting instrument and a compass, each being provided with a transmitter, a motive means actuated from each transmitter, a ship's heading indicator and a target bearing indicator geared to said means and a manual setting means for each indicator, one of said means being adapted to prevent one indicator from being turned by the setting of the other indicator.

8. In an indicator for ships, a plurality of concentrically mounted indicators, a plurality of repeater motors geared to said indicators, and a manual setting means for each indicator, one of said means being adapted to prevent an indicator from being turned by the setting of another of said indicators.

9. In an indicator for ships, a plurality of concentrically mounted indicators, a plurality of repeater motors geared to said indicators, and to each other through differential gearing, and a manual setting means for each indicator, one of said means being adapted to prevent an indicator from being turned by the setting of another of said indicators.

In testimony whereof, I have signed my name to this specification in the presence of two subscribing witnesses, this 12th day of November 1914.

ELMER A. SPERRY.

Witnesses:
EARL W. CHAFEE,
F. R. ALLEN.

Copies of this patent may be obtained for five cents each, by addressing the "Commissioner of Patents Washington, D. C."